(12) United States Patent
Gross et al.

(10) Patent No.: US 8,539,661 B2
(45) Date of Patent: Sep. 24, 2013

(54) FRAME FOR A VEHICLE SEAT

(75) Inventors: Bernd Gross, Langenfeld (DE);
Andreas Dannheisig, Sassenberg (DE);
Marian Stepankowski, Stuttgart (DE);
Joshua Hesterberg, Mettmann (DE)

(73) Assignee: Johnson Controls GmbH, Burscheid (DE)

( * ) Notice: Subject to any disclaimer, the term of this patent is extended or adjusted under 35 U.S.C. 154(b) by 385 days.

(21) Appl. No.: 12/740,642

(22) PCT Filed: Oct. 29, 2008

(86) PCT No.: PCT/EP2008/009129
§ 371 (c)(1),
(2), (4) Date: Apr. 29, 2010

(87) PCT Pub. No.: WO2009/056294
PCT Pub. Date: May 7, 2009

(65) Prior Publication Data
US 2010/0244538 A1   Sep. 30, 2010

(30) Foreign Application Priority Data
Oct. 29, 2007   (DE) .......................... 10 2007 051 895

(51) Int. Cl.
*B23P 11/00* (2006.01)
*B60N 2/68* (2006.01)

(52) U.S. Cl.
USPC .................... 29/428; 29/DIG. 1; 29/DIG. 48; 297/452.18

(58) Field of Classification Search
USPC .................. 297/452.18, 452.2, 463.1, 463.2; 29/428, DIG. 1, DIG. 48, 401.1; 228/141.1; 156/60
See application file for complete search history.

(56) References Cited

U.S. PATENT DOCUMENTS

| | | | | |
|---|---|---|---|---|
| 4,350,390 | A * | 9/1982 | Ogawa ...................... | 297/452.18 |
| 5,636,901 | A * | 6/1997 | Grilliot et al. ........... | 297/452.18 |
| 5,671,976 | A | 9/1997 | Fredrick | |
| 6,019,273 | A * | 2/2000 | Garnweidner .............. | 228/144 |
| 6,132,003 | A * | 10/2000 | Sakurai et al. .......... | 297/452.18 |
| 6,739,673 | B2 * | 5/2004 | Gupta et al. ............. | 297/452.65 |
| 6,761,412 | B1 * | 7/2004 | Garnweidner et al. .. | 297/452.18 |
| 2004/0227389 | A1 * | 11/2004 | Yoshida .................... | 297/452.18 |
| 2006/0071514 | A1 * | 4/2006 | Farquhar et al. ............... | 297/61 |
| 2007/0040362 | A1 | 2/2007 | Saberan | |
| 2010/0141009 | A1 * | 6/2010 | Kirch et al. .............. | 297/452.18 |

FOREIGN PATENT DOCUMENTS

| | | |
|---|---|---|
| DE | 69702023 T2 | 6/1997 |
| DE | 19826732 A1 | 6/1998 |
| DE | 102004044734 A1 | 9/2004 |

(Continued)

OTHER PUBLICATIONS

Patent Treaty Cooperation; International Preliminary Report on Patentability (English Translation); PCT/EP2008/009129; Jun. 29, 2010.
Patent Treaty Cooperation;Written Opinion of the International Searching Authority (English Translation); PCT/EP2008/009129; Jul. 8, 2010.

(Continued)

*Primary Examiner* — Milton Nelson, Jr.
(74) *Attorney, Agent, or Firm* — Butzel Long

(57) ABSTRACT

The invention relates to a vehicle seat, in particular a motor vehicle seat, comprising a structural element that consists of several components which are at least partly connected to one another. Furthermore, the present invention relates to a method for producing the motor vehicle seat according to the invention.

7 Claims, 9 Drawing Sheets

(56) References Cited

FOREIGN PATENT DOCUMENTS

| DE | 102006039168 A1 | 2/2007 |
| EP | 0233822 A | 8/1987 |
| JP | 7-298947 | 11/1995 |
| JP | 11-216037 | 8/1999 |
| WO | WO2006055616 A | 5/2006 |
| WO | WO2008049639 A | 5/2008 |

OTHER PUBLICATIONS

WIPO, International Search Report; PCT/EP2008/009129; Mar. 24, 2009.
English language translation abstract of JP 11-216037, date of publication: Aug. 10, 1999, Title: Seat Frame.
Japanese Office Action for Application No. 2010-531454, dated Jan. 23, 2013.

* cited by examiner

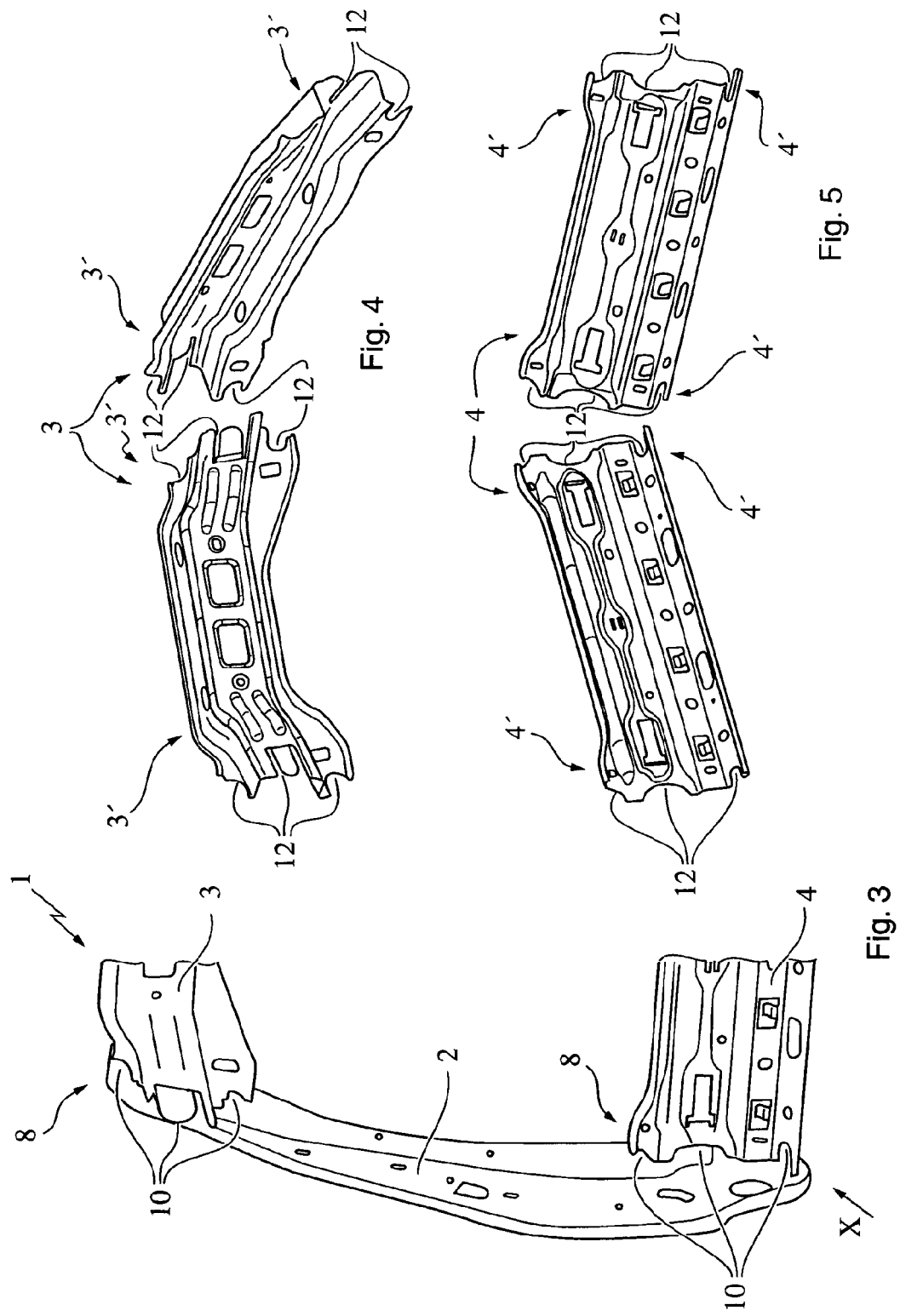

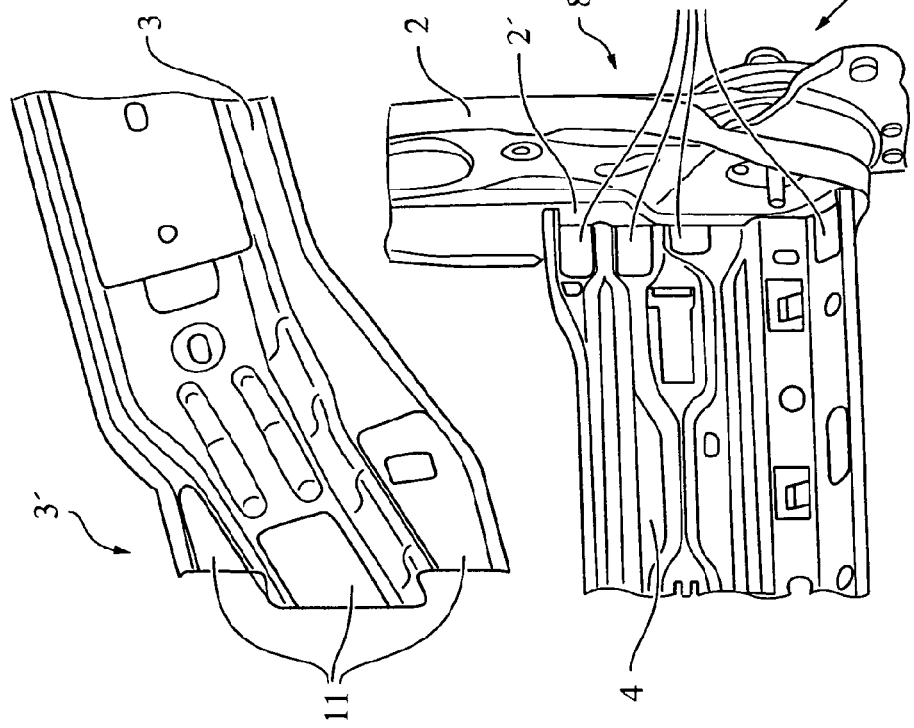

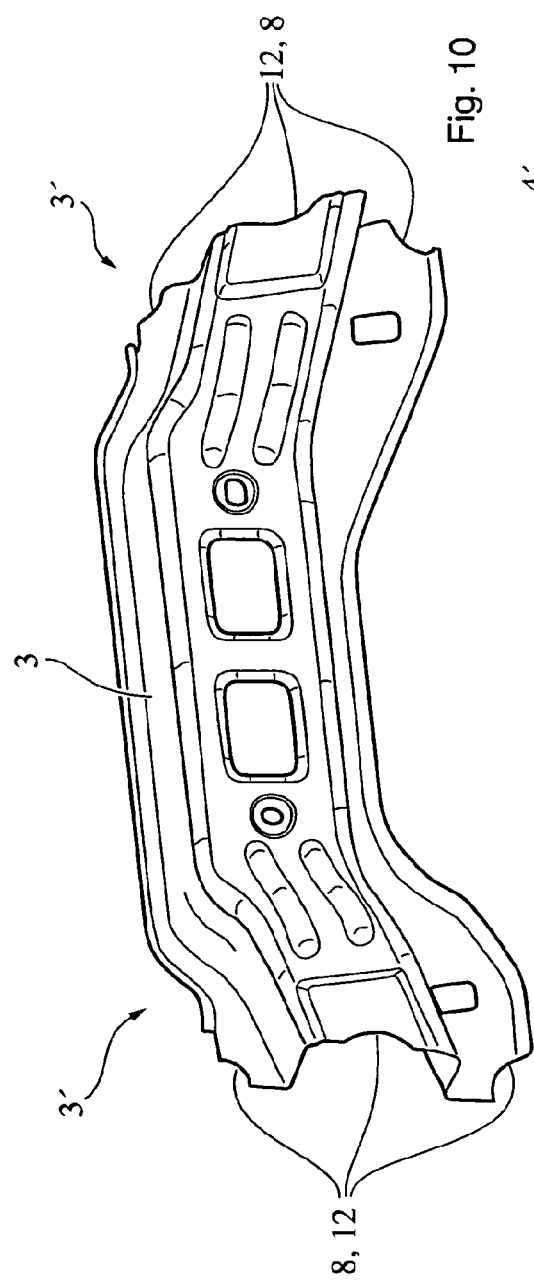
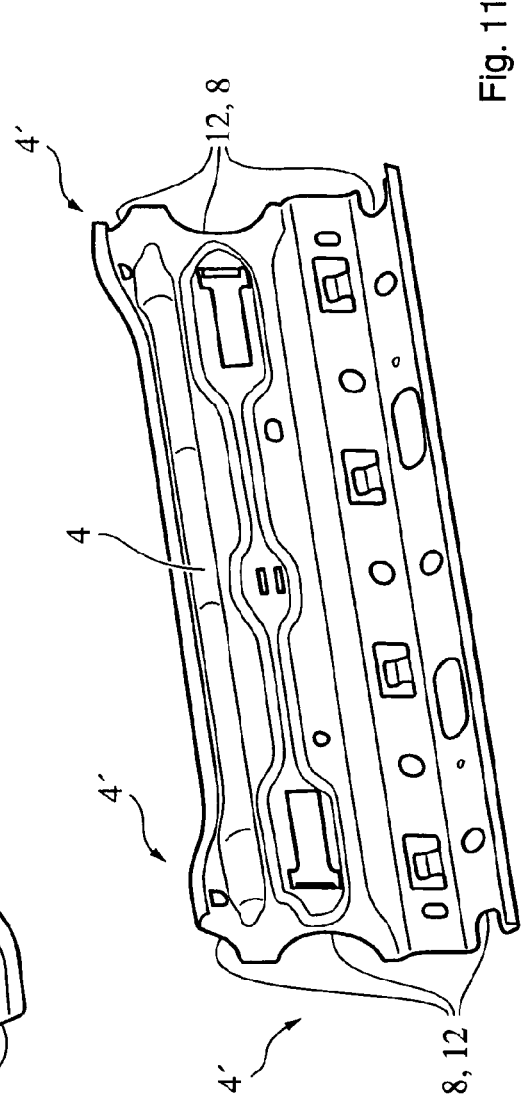
Fig. 10
Fig. 11

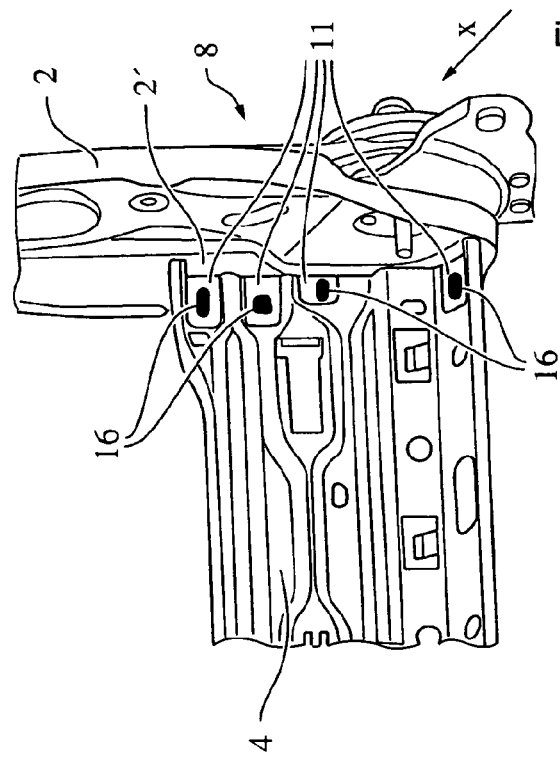

FRAME FOR A VEHICLE SEAT

CROSS REFERENCE TO RELATED APPLICATIONS

The present application is a U.S. National Stage Filing of International Application No. PCT/EP2008/009129, filed on Oct. 29, 2008, titled "STRUCTURAL ELEMENT FOR A VEHICLE SEAT", which claims priority to German Patent Application No. DE 10/2007-051-895.3, filed Oct. 29, 2007, the entire disclosures of which are incorporated herein by reference.

BACKGROUND

The present disclosure relates to a vehicle seat, in particular a vehicle seat having a frame that includes a plurality of members which are at least partly connected to one another. Furthermore, the present disclosure relates to a process for producing the vehicle seat.

The majority of vehicle seats currently mass-produced are formed using structural elements of steel with a wide variety of profiles. However, vehicle seats having a lightweight construction using different materials, are also known. Vehicle seat frames of this type are disclosed, for example, in DE 10 2004 044 734, DE 697 02 023 T2 and DE 198 26 732 A1. However, frames constructed from lightweight materials have unique connections and are produced in a smaller quantity than steel frames and are therefore more expensive to make.

Therefore, there is a need in the art for a vehicle seat which can also be made available in a lightweight construction at low cost.

The seat frame includes a plurality of members which are at least partly connected to one another by an attachment method, such as welding, soldering, positively or nonpositively or by adhesive bonding, or the like. At least one member is available in a plurality of materials and the shape of the member is configured such that it remains unchanged irrespective of the material used to form the member. In each connection region of adjoining members which bear the main load, the connection includes at least, two, or more connecting portions.

An advantage of the present disclosure is that the vehicle seat can be located in any desired arrangement in the respective motor vehicle. The seat can accordingly be a front seat or a back seat. The seat may provide space for one or more people. The seat may also be a bench.

Another advantage of the present disclosure is that at least one of these frame members is produced from a lightweight material, for example aluminum or an aluminum alloy. The frame member may be designed differently for different types of connection. For example, a frame member may have a slightly different edge contour depending on whether it is adhesively bonded or welded to the other member.

Still another advantage of the present disclosure is that certain members, for example in a steel construction, may be able to be replaced by a member formed using a lightweight material, without it being necessary to change the adjoining frame members. Still a further advantage of the present disclosure is that a member may be designed differently depending on the way in which it is connected to an adjoining member. This makes it possible to utilize various seat configurations on a vehicle platform using one structural design. Therefore both a "low cost variant" consisting of steel and a "high end variant" comprising a hybrid structure may be used. In addition, different connection variations can be used.

In the hybrid variant, steel members may be joined with members which are not produced from steel, for example lightweight material, for example plastic, aluminum and/or an aluminum alloy or a combination thereof. A further advantage of the present disclosure is that the seat frame can be produced by using virtually the same production equipment in terms of welding robots/plants and apparatuses.

According to the disclosure, at least one cross member and the side member are connected to one another in a connection region. An example of a connection is laser welding, laser hybrid welding, laser brazing/soldering, hybrid soldering and/or adhesive bonding.

Another example of a connection is a positive and/or non-positive fit, such as riveting, belling, clinching (toxing), flanging and/or screwing or the like.

Other features and advantages of the present disclosure will be readily appreciated, as the same becomes better understood after reading the subsequent description taken in conjunction with the accompanying drawings.

BRIEF DESCRIPTION OF THE FIGURES

FIG. 3 is a partial view of a further example of the backrest frame.
FIG. 4 is an elevational front and rear view of the upper cross member.
FIG. 5 is an elevational front and rear view of the lower cross member.
FIG. 6 is a partial view of the upper crosspiece suitable for an adhesive connection.
FIG. 7 is a partial view of an adhesive connection between the backrest side member and the lower cross member.
FIG. 10 is a perspective view of the upper cross member which can be used as a welding part and as an adhesive part.
FIG. 11 is a perspective view of the lower cross member which can be used as a welding part and as an adhesive part.
FIG. 15 is an enlarged view of a rectangular adhesive connection seam.

DETAILED DESCRIPTION

The seat includes a frame, such as a backrest frame operatively connected to a seat cushion frame. The backrest frame constitutes the base structure for the backrest of a motor vehicle seat. A recliner for adjusting the inclination of the backrest, the spring arrangement of the motor vehicle seat, the headrest and, if appropriate, airbags are generally arranged on the backrest frame. The backrest frame has backrest side members that are connected to one another by a lower cross member and/or an upper cross member in a manner to be described. The backrest side members are preferably three-dimensionally shaped components made of any desired material, for example steel sheet, a lightweight material, such as aluminum or plastic or a combination of these materials, and may remain unchanged, irrespective of the embodiment of the crossmembers and/or of the connection between the cross member and the side members of the backrest. The lower and/or upper cross member is particularly preferably made of steel or is a lightweight construction. In both cases, the crossmembers are preferably in the form of profiles and/or pressed parts. The lightweight construction is preferably an extrudable profile, particularly preferably a profile formed of a lightweight material, preferably aluminum, or a stamped part made, of a lightweight material, for example aluminum. The seat cushion frame has a similar construction to the back rest frame.

The seat cushion frame and/or the cross members may be coated with aluminum, zinc, an aluminum alloy and/or a zinc alloy. This is advantageous for an integral connection, such as for laser welding, laser hybrid welding, laser soldering or CMT welding or the like.

Figure 1:
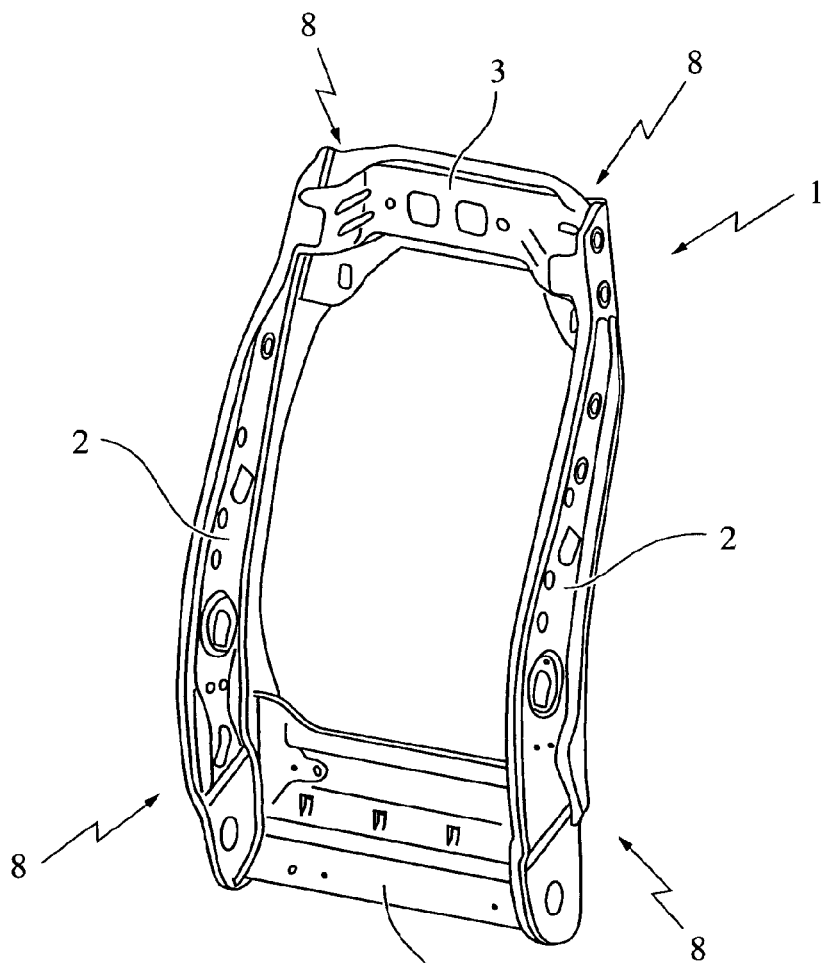
FIG. 1 is a perspective view of a backrest frame for a seat.

An exemplary embodiment (FIG. 1) of a seat, such as for a vehicle shows a backrest frame 1, formed using two backrest side parts 2 of high-strength steel, an upper cross member 3 and a lower cross member 4, both of which are produced from aluminum. An attachment process, such as a welding technique, a cold metal transfer (CMT) welding process or other connection techniques, such as adhesive bonding, are used to connect the upper and lower cross member 3, 4 to the galvanized (required for CMT) or bare high-strength backrest side members 2. This welding process makes it possible to connect the aluminum parts to the galvanized steel components. The interfaces at which the cross members 3, 4 are connected to the backrest side parts 2 have a modular configuration, such that they allow the optional incorporation of aluminum cross members 3, 4, which normally have a thicker metal sheet, or else steel 3, 4 (smaller material thickness with an identical design), without the backrest side members 2 having to be adapted. This means that two variations of a backrest frame 1 can be provided using identical backrest side members. For example, the conventional design constructed of steel/steel and also the hybrid design of steel/aluminum. The connection process can also be employed equally for all material configurations.

The connection region may be selected so that there is enough space for the member with the greatest cross-section. In order to connect two members which are produced from steel or a lightweight material, it may be necessary to utilize an adaptor to achieve a suitable connection. In another example, a member may be expanded in the connection region, such as by hydroforming. Also, a member may have the same outside diameter and a different wall thickness. For example, a member made of a lightweight material may have a larger wall thickness than a member made of steel. This may eliminate the need for an adapter.

In an example, the crossmember may have a connection region that is configured differently depending on the type of connection, in a manner to be described. Alternatively, the connection region configuration may be identical for different materials.

Figure 2:
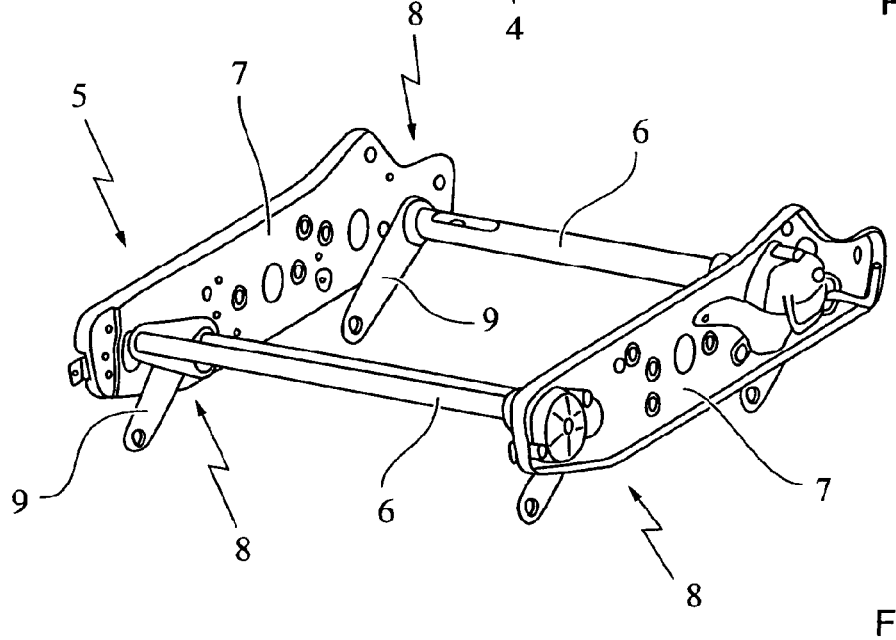
FIG. 2 is a perspective view of the seat cushion frame for a vehicle seat.

The seat also includes a seat cushion frame 5. The seat cushion frame 5 may be adjustable with respect to the backrest frame 1, substructure 5 (having 2-way, 4-way or 6-way adjustment) (FIG. 2). The seat cushion frame 5 includes two seat side parts 7 and at least one seat cross member 6 interconnecting the seat side parts 7. The side members and cross members may be three-dimensionally shaped as previously described with respect to the back rest frame members. The seat cross member 6 may be made of a lightweight material construction such as aluminum or aluminum alloy or plastic or the like or another material such as a steel material. The cross member and side member are connected to one another in a connection region using an attachment technique, such as welding, laser welding, laser braising, soldering hybrid soldering or the like, or bonding, such as an adhesive bond or the like. The aluminum seat cross member 6 has a larger cross section than the comparable steel seat cross member 6 and/or a greater wall thickness than the seat cross member given the same outside diameter. For example, in order to behave similarly in the event of a crash. Furthermore, the substructure side members 7 may be made of steel or of a lightweight material, for example aluminum.

The seat cross members are inserted into bore holes in the seat side members and secured using an attachment process such as welding, i.e. CMT welding, or adhesively bonded. An adhesive bond may be utilized with a seat having 2-way adjustment. In order to ensure that cross members having different diameters can be accommodated, the bore hole is dimensioned according to the cross section of the largest seat cross member, which in this example is, the aluminum cross member. When using steel cross members having a smaller cross section, it is then possible to use a gasket such as an adapter sleeve. The steel cross member can also be expanded in the connection region. The seat cushion frame may also include rockers 9. The rockers 9 may be produced from lightweight metal, steel and/or coated steel.

FIG. 3 shows a further embodiment of the backrest frame 1. In the present example, the upper cross member 3 and the lower cross member 4 are connected to one another by an attachment method such as welding, CMT (cold metal transfer) welding. In this case, the upper cross member and the lower cross member are inserted into the backrest side member in the x direction, as indicated by the arrow. The attachment method may include welding, such as with three weld seams in each case. The same procedure may also be utilized when adhesively bonding the side part to the crosspieces, or when connecting these components using any other technique. Advantageously the backrest frame does not have to be moved or otherwise repositioned during processing, which would otherwise considerably increase manufacturing expenses.

FIGS. 4 and 5 show the upper cross member 3 and, respectively, the lower cross member 4 each in two views. It can clearly be seen that both the connection region 3' of the upper cross member 3 and the connection region 4' of the lower cross member 4 have an edge that is contoured, as shown at 12, along which the welding takes place. These contoured edges 12 are produced using a forming technique, such as by stamping. This stamping lengthens the contoured edge and therefore increases the length of the weld seam placed along the contour 12, which also increases the stability of the connection to the backrest side part. For example, the length of the weld seam may be between 20 and 100 mm. If there are a plurality of portions, the portions may be arranged in different planes, such as at an angle to one another.

FIG. 6 shows the upper cross member 3, which in this example is configured such that it can be attached to the backrest side part 2 in the connection region 8 using an attachment method such as by an adhesive bond. The adhesive portion or bond may have a predetermined shape, such as rectangular or circular which is produced by a bead of adhesive being applied to the respective portion and the members then being joined together. The adhesive surface area may range from 1500-4000 mm2 per connection region for the lower cross member and for the upper cross member. For example, the cross member 3 has a plurality of adhesive bonding surfaces, such as three. If there are a plurality of adhesive points the adhesive points may be located in different planes which are located at an angle to one another. A lower adhesive surface may be arranged at a right angle to the two upper adhesive surfaces, such that the component is fixed completely to the backrest side part in all directions. In another example this adhesive bond may be formed by way of a tox connection (not shown), i.e. a connection obtained by way of clinching. The combination of a positive and/or non-positive connection serves to fix the parts until the adhesive connection has completely cured. In addition, this positive and/or nonpositive connection may increase the load-bearing capacity of the backrest frame.

For example, the connection may be a positive and/or non-positive fit. The nonpositive fit is provided, for example, by means of riveting, belling, clinching (toxing), crimping or flanging.

FIG. 7 shows the lower cross member 4, which is attached or bonded to the backrest side member, such as by applying adhesive at an adhesive connection point the lower cross member and side member at 11. This connection, may also be supplemented by another attachment method, such as a tox connection (not shown). The connection region 2' of the side member 2, i.e. the region at which the member 4 bears against or is adjacent to the side member 2, is dimensioned for an adhesive connection or bonding. Although the connection surface required for an adhesive connection or bond is generally larger than that required for a welded connection, this region 2' is, however, equally suitable for a welded connection or bond. This similarly applies to the connection region 2', in which the upper cross member is secured to the backrest side member 2.

Figure 8:
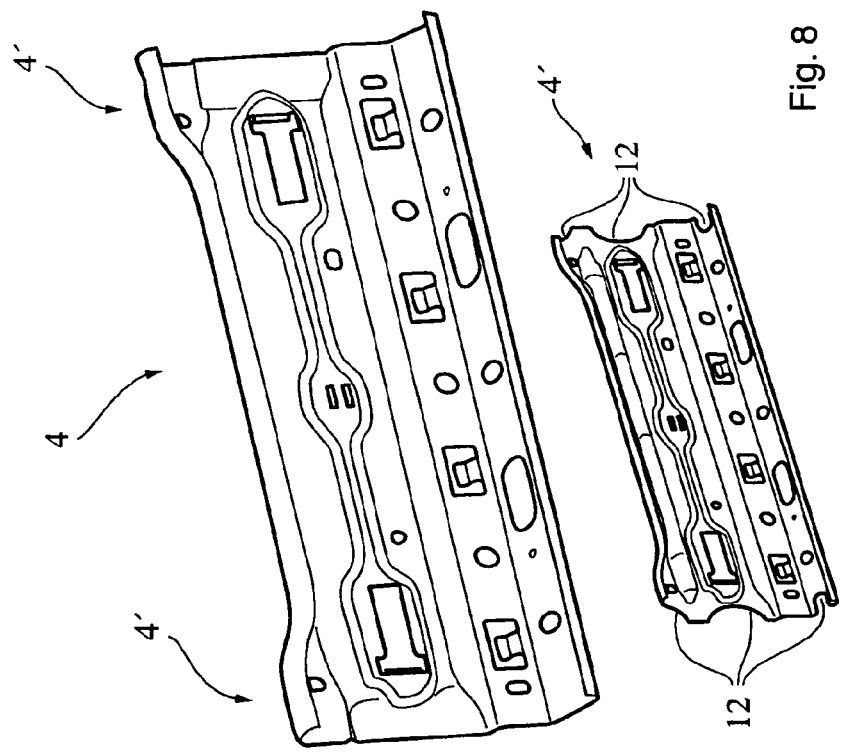
FIG. 8 is a perspective view of the lower cross member as an adhesive part and as a welding part.

FIG. 8 shows various examples of the lower cross member 4. The top illustration shows a cross member which is suitable, for an adhesive connection or bond. Similarly, the bottom illustration shows the cross member which is suitable for a bond such as a welded/soldered connection. The two crosspieces differ merely in terms of the contoured edge 12. Initially, all parts may be produced so as to be suitable for a connection or bond using an adhesive. If the intention is then to weld a crosspiece to the backrest side member, material is subsequently removed from the edge region of the crosspiece or removed therefrom such as by stamping or the like along the contoured edge 12.

Figure 9:
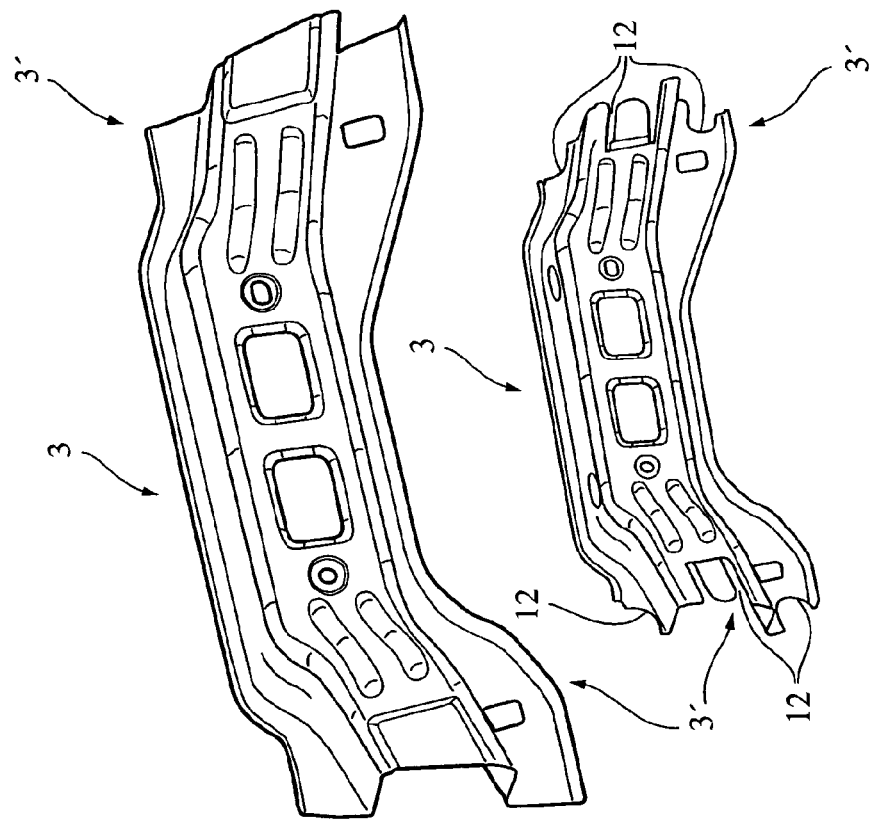
FIG. 9 is a perspective view of the upper cross member as an adhesive part and as a welding part.

FIG. 9 is similar to FIG. 8, but illustrates the upper cross member 3.

FIGS. 10 and 11 show the upper cross member and the lower cross member, which are suitable for a welded/soldered connection and/or adhesive connection. In this example, the cross members 3, 4 are configured in such a way that they can be connected to the side member 2 without being changed, i.e. irrespective of the connection method, i.e. by welding/soldering or by adhesive bonding. A comparison between the cross members 3, 4 in FIGS. 8 and 9 shows that the regions that have been removed from the edge region are smaller than in the example of a cross member which is suitable only for welding (cf. the bottom illustration in FIGS. 8, 9). As a result, the surface area available for adhesive bonding remains comparatively large. The contoured edge 12 available for the welding/soldering is not as long as in the cross member according to FIGS. 8, 9 (bottom illustration), but is longer than an example of a straight contour, and always has sufficient dimensions.

Figure 12:
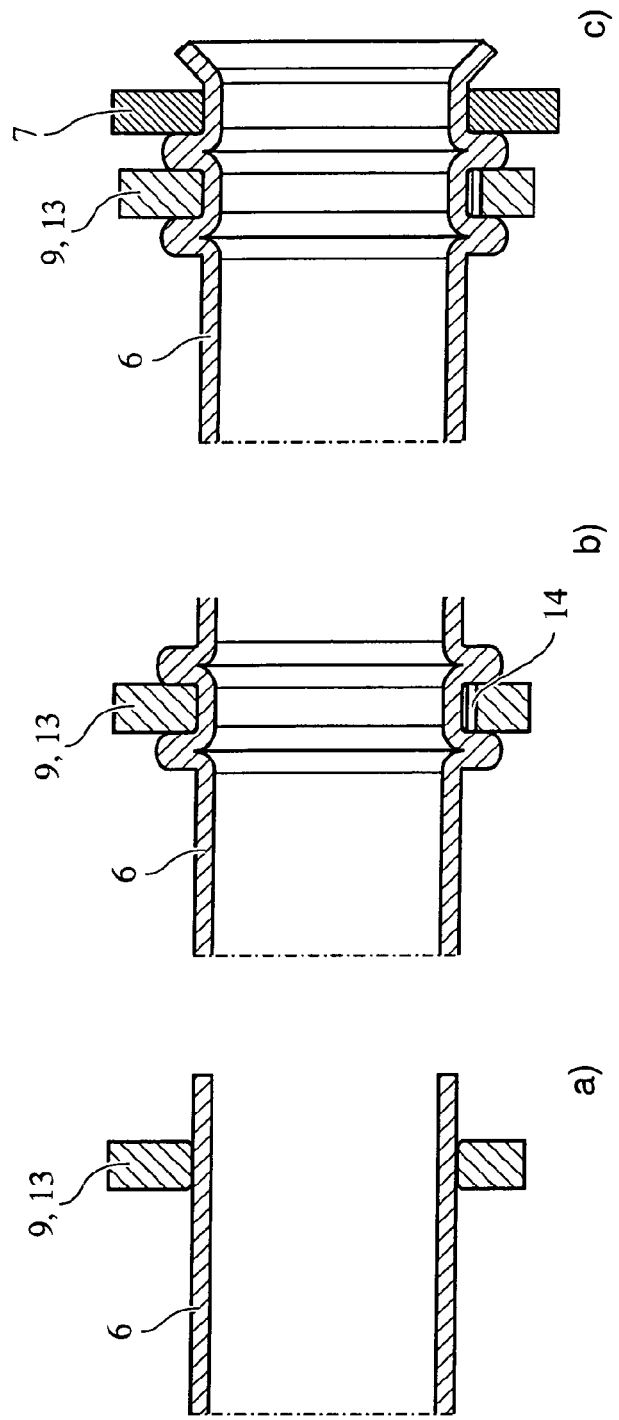
FIGS. 12a, 12b and 12c illustrate the connection between the cross member and the seat side member.

FIG. 12 schematically shows an example of a connection between a cross member 6 and the seat side member 7. A connecting mechanism 13, which is part of a seat height-adjusting mechanism (not shown) is operatively connected to a height-adjusting mechanism. The connecting mechanism, is initially guided over the cross member 6 (FIG. 13 a) and then connected to the cross member by an attaching technique such as crimping. Since the inside diameter of the connecting mechanism 13 is provided with positive locking mechanism 14, this provides an axially fixed connection, which can also be used to transmit torques. Thereafter, the cross member is connected to the seat side member 7 by conical expansion of the edge region of the cross member 6. This connection is configured in such a way that the cross member 6 can rotate in the side member 7. In another example, this connection can also be configured to be fixed in terms of torque.

Figure 13:
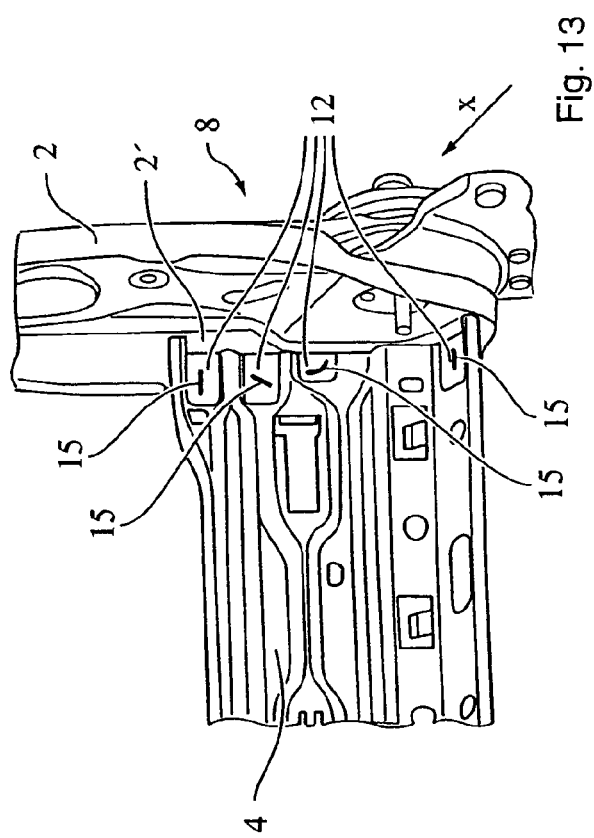
FIG. 13 is an enlarged view of a connection with a curved connection seam.

FIG. 13 shows an example of three connection points each formed by an attachment method such as a welding to form a weld seam or soldering to form a solder seam 15. The middle seam is in the form of a curved seam a plurality of seams can also have a curved design similarly, other seam shapes may be utilized.

Figure 14:
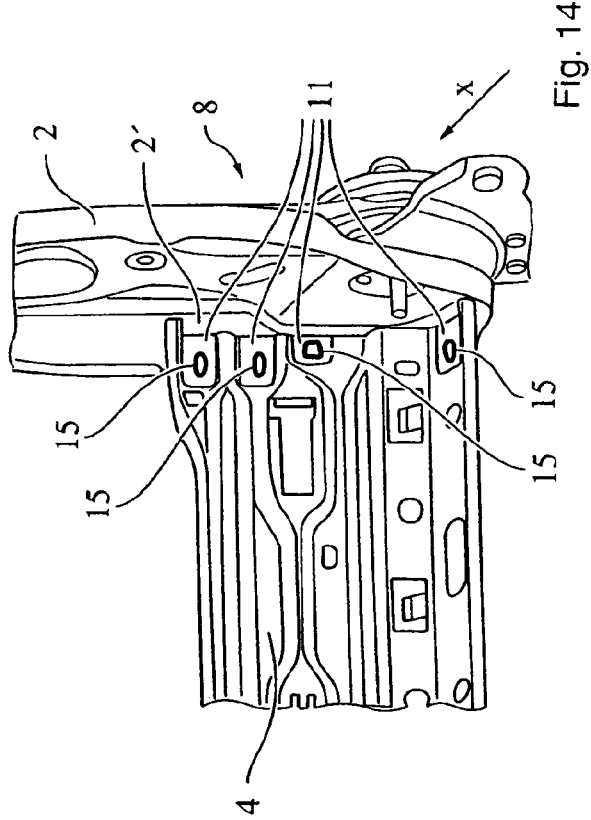
FIG. 14 is an enlarged view of a connection with a circular adhesive connection.

For example, FIG. 14 shows three connection points each with a weld seam or solder seam 15 that is circular. In another example, only one seam may be circular and the others are straight, curved or configured in the shape of a circular arc segment, or another shape.

In a further example, FIG. 15 shows three connection points each with a rectangular adhesive point.

Many modifications and variations of the present disclosure are possible in light of the above teachings. Therefore, the present disclosure may be practiced other than as specifically described.

The invention claimed is:

1. A process for producing a backrest frame for a motor vehicle seat, comprising:
   providing at least two side frame members and at least one cross member;
   connecting the cross member to each of the side frame members using an attachment technique at interfaces between connection regions at opposite ends of the cross member and a connection region at an edge of each of the side frame members;
   wherein at least one of the connection regions is configured for at least two different attachment techniques, whereby at least one of the members is attachable to another of the members using any of the at least two different attachment techniques, such that at least one of the members can be made of any one of at least two different materials, further comprising a step of removing a portion of one of the connection regions to increase an edge length for welding.

2. The process set forth in claim 1 including a step of forming at least one welded connection along a curved edge of a cross member.

3. The process as set forth in claim 1 including a step of forming a welded connection having a circular shape.

4. The process as set forth in claim 1, including a step of forming an adhesive connection.

5. The process as set forth in claim 1 including a step of converting one of the connection regions of one of the members from an adhesive connection configuration to a weld connection configuration before the welding.

6. The process as set forth in claim 1 wherein at least one member is formed of steel and connected to another member formed of a material selected from the group consisting of aluminum and aluminum alloys.

7. The process as set forth in claim 1 wherein the attachment technique is selected from the group consisting of laser welding, laser soldering and laser hybrid welding.

* * * * *